US00RE34082E

United States Patent [19]

Greene

[11] E Patent Number: Re. 34,082

[45] Reissued Date of Patent: Sep. 29, 1992

[54] VARIABLE THRESHOLD WIND SHEAR WARNING SYSTEM

[75] Inventor: Leonard M. Greene, White Plains, N.Y.

[73] Assignee: Safe Flight Instrument Corporation, White Plains, N.Y.

[21] Appl. No.: 646,850

[22] Filed: Jan. 25, 1991

Related U.S. Patent Documents

Reissue of:

[64] Patent No.: 4,855,738
Issued: Aug. 8, 1989
Appl. No.: 79,905
Filed: Jul. 31, 1987

[51] Int. Cl.[5] ..... G08B 23/00

[52] U.S. Cl. ..... 340/968; 244/181; 340/969; 364/433

[58] Field of Search ..... 340/968, 969, 963, 964, 340/967, 968, 970; 73/178 R, 178 T; 244/181, 182; 364/428, 433, 434

[56] References Cited

U.S. PATENT DOCUMENTS

| | | | |
|---|---|---|---|
| 3,327,972 | 6/1967 | Greene | 340/968 |
| 4,012,713 | 3/1977 | Greene et al. | 340/968 |
| 4,079,905 | 3/1978 | Greene | 340/968 |
| 4,133,503 | 1/1979 | Bliss | 340/968 |
| 4,281,383 | 7/1981 | Lebrun | 340/968 |
| 4,413,321 | 11/1983 | Lebrun | 364/428 |
| 4,530,060 | 7/1985 | Greene | 364/428 |
| 4,725,811 | 2/1988 | Muller et al. | 340/963 |
| 4,728,951 | 3/1988 | Johnson et al. | 340/968 |
| 4,855,738 | 8/1989 | Greene | 340/968 |

*Primary Examiner*—Jin F. Ng
*Assistant Examiner*—Brent A. Swarthout
*Attorney, Agent, or Firm*—Edward A. Sokolski

[57] ABSTRACT

An improved wind shear warning system for aircraft. A wind shear signal representing wind shear as modified by the downdraft drift angle of the aircraft is used to provide a warning signal when the wind shear signal exceeds (negatively) a variable threshold. The threshold for the warning signal is modified in response to the pilot controlled excess of the airspeed of the aircraft over a reference airspeed during the approach to a landing so as to avoid unnecessary warnings. The threshold is further altered when the wind shear signal during approach indicates the high likelihood of a reversal of wind shear conditions.

6 Claims, 2 Drawing Sheets

VARIABLE THRESHOLD WIND SHEAR WARNING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to aircraft instruments, and more particularly to such instruments that provide outputs indicative of wind shear conditions. Wind shear may be defined as the condition that exists when the velocity and/or direction of the wind is significantly changing with altitude, horizontal position or time, or any combination thereof. Wind shear can pose a particularly hazardous situation when an aircraft is making a landing approach to an airport and is descending through an air mass that exhibits significant wind shear. Such wind shear can cause the airspeed experienced by the descending aircraft to increase and decrease significantly within short periods of time. An increase in airspeed may mislead the pilot into reducing aircraft power, and a decrease in airspeed can reduce the airspeed of the aircraft below the speed at which safe control of the aircraft may be maintained.

Wind shear also, may include local updrafts and downdrafts as well as changes in the horizontal component of the velocity of the wind. Thus, wind shear may cause changes not only to the airspeed of the aircraft but may also cause vertical accelerations of the aircraft thus causing it to depart from the flight path it otherwise would follow in still air. Such vertical departures from flight path are characterized herein by the downdraft drift angle.

A warning to the pilot of the existence of a dangerous level of such wind shear conditions can alert the pilot to incipient changes in the airspeed and to deviations from the flight path so as to enable the pilot to take immediate corrective action.

2. Description of the Prior Art

U.S. Pat. No. 4,012,713 describes a system for providing an output signal indicative of a wind shear condition. U.S. Pat. No. 4,079,905 ("905") describes an improved system which additionally senses the downdraft drift angle of the aircraft i.e. the departure from the normal approach flight path. The "905" device combines a signal representing the downdraft drift angle with a signal representing the rate of change of the instantaneous airspeed of the aircraft to provide a composite signal which is used to provide a warning to the pilot of incipient dangerous flight conditions.

As a matter of good piloting practice, whenever significant wind shear conditions are expected, the pilot normally selects an approach airspeed that is somewhat greater than the airspeed that would be used in the absence of such anticipated wind shear conditions. The additional approach airspeed operates to provide an increased margin of safety in circumstances where wind shear is significant. As a consequence, in order for a wind shear warning system to provide a warning of incipient unsafe flight conditions, while at the same time not giving an excessive number of warnings when such unsafe conditions are not imminent, the warning system should include a mechanism for adjusting the warning threshold in accord with the pilot selected excess of the approach airspeed over the "normal" approach airspeed.

SUMMARY OF THE INVENTION

This invention constitutes an improvement of the inventions described in U.S. Pat. Nos. 4,012,713 and 4,079,905 in that it provides a warning threshold which is adjusted in accord with the selected excess of the approach airspeed over the normal approach airspeed for the aircraft. The warning threshold is increased in magnitude in direct response to the excess of the approach airspeed over the normal airspeed provided this excess is not induced by wind shear. Therefore, when the wind shear signal is positive (indicating an increasing head wind) and above a predetermined level, then any increase in the magnitude of the warning threshold is inhibited. Furthermore, when the wind shear signal exceeds a second still more positive predetermined level, the magnitude of the warning threshold is reduced in magnitude.

DESCRIPTION OF THE PREFERRED EMBODIMENT

Figure 2:
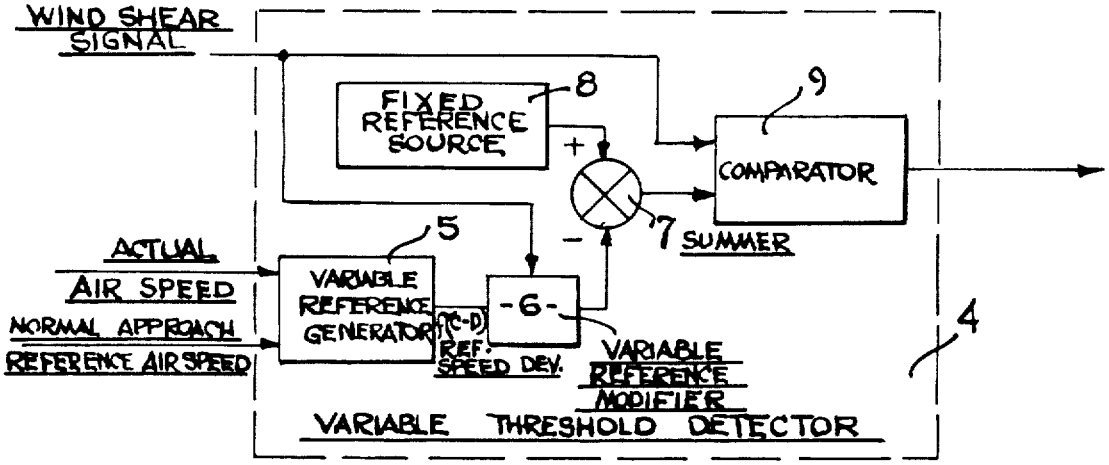
FIG. 2 is a functional block diagram of the invention.

Reference is made to FIG. 2 of U.S. Pat. No. 4,079,905 ("905"). The present invention is an improvement of the invention described in U.S. Pat. No. 4,079,905 and which is depicted in FIG. 2 thereof. The present invention improves and replaces the threshold detector 46 and the warning device 47 depicted in FIG. 2 of the "905" patent and utilizes the wind shear signal output from damping circuit 45 depicted in FIG. 2 of the "905" patent.

As described in the "905" patent, the wind shear signal output from damping circuit 45 is the combination of a signal representing the difference between the horizontal acceleration of the aircraft and the rate of change of the instantaneous airspeed of the aircraft together with a signal representing the downdraft drift angle of the aircraft. The composite signal that is output from damping circuit 45 in FIG. 2 of the "905" patent is referred to herein as the "wind shear signal". The following description uses the sign convention that a negative value for the wind shear signal would be produced by a decreasing airspeed due to wind shear or by an alteration of the flight path toward the ground due to wind shear. Thus, a warning signal would be produced by the "905" device whenever the wind shear signal was more negative than the warming threshold, which threshold is, itself, a negative value. In the following description of the invention, the arithmetic signs of the signals and of the references are taken into account in making comparisons. Hence, for example, a statement that A is less than B means that, if B is a positive number, than A is either a positive number having a magnitude of less than B or A is a negative number of any magnitude.

Figure 1:
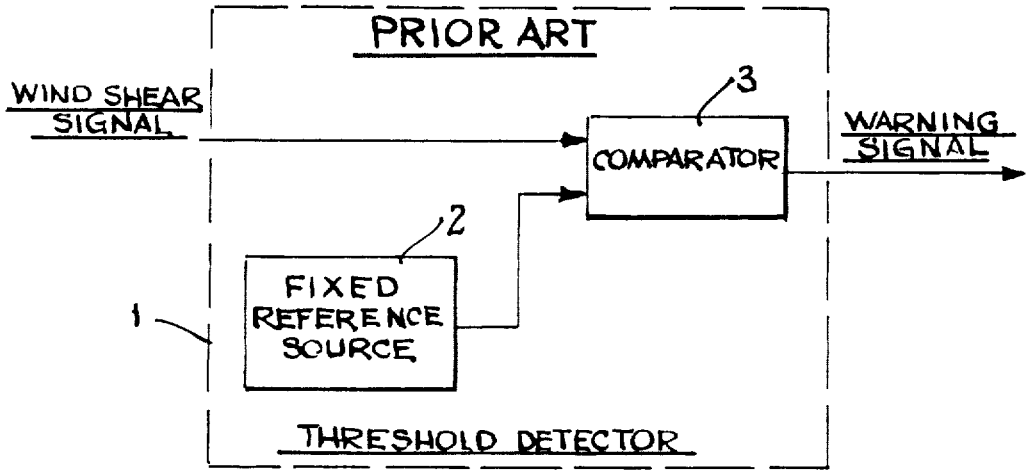
FIG. 1 depicts a threshold detector of the prior art.

Referring now to FIG. 1 of the present invention. FIG. 1 depicts a threshold detector of the prior art. The threshold detector 1 has two functional components, a fixed reference source 2 and a comparator 3. Comparator 3 operates to output a warning signal whenever the wind shear signal input to level detector 3 is more negative than (i.e. less than) the value of the reference signal supplied to level detector 3 from fixed reference source 2. As indicated above, the value of the reference signal also is negative.

Referring now to FIG. 2 which is a functional block diagram of the variable threshold detector of the present invention. Variable threshold detector 4 comprises a variable reference generator 5 which is responsive to the excess of the actual airspeed of the aircraft above the normal approach reference airspeed for the aircraft. Whenever the actual airspeed of the aircraft is greater than the normal approach reference airspeed, variable reference generator 5 outputs a signal to variable reference modifier 6 which is proportional to the excess of the actual airspeed over the normal approach reference airspeed. The constant of proportionality is selected so as to obtain appropriate warning. The output from variable reference generator 5 also need not be strictly proportional to the excess of the actual airspeed over the normal approach reference airspeed but may depart from such strict proportionality in order to obtain improved performance. A zero signal is output from variable reference generator 5 whenever the actual airspeed is less than the normal approach reference airspeed.

Whenever the wind shear signal (taking into account its arithmetic sign) is less than a first preselected positive level, variable reference modifier 6 passes the signal output from variable reference generator 5 straight through to summer 7. However, when the wind shear signal exceeds the first predetermined positive level, but is less than a second, higher predetermined positive level, variable reference modifier 6 inhibits the pass-through of the signal from variable reference generator 5 to summer 7. In other words, there is zero signal output from variable reference modifier 6 to summer 7.

Finally, when the wind shear signal exceeds the second predetermined positive level, variable reference modifier 6 provides a fixed negative bias to the variable reference generator 5 and outputs this negative signal to summer 7.

As described in more detail below, whenever the first or second predetermined positive threshold is exceeded the output of variable reference modifier 6 is altered and remains altered throughout the duration of the landing approach.

Summer 7 inverts the sign of the signal from variable reference modifier 6 and then adds the inverted signal to a fixed (negative) reference signal from fixed reference source 8. The output of summer 7 is then compared in comparator 9 with the wind shear signal and a warning signal is output from comparator 9 whenever the wind shear signal is less than (more negative than) the variable reference signal output from summer 7.

Thus, the variable threshold detector operates to provide a warning signal whenever the wind shear signal is less than the variable reference level generated within the variable threshold detector. For modest wind shear signals, the variable reference level within the variable threshold detector is decreased (i.e. made more negative) in response to the excess of the actual airspeed over the normal approach reference airspeed thus requiring a more negative wind shear signal before a warning is given. As a consequence, when the pilot has elected to use an increased approach airspeed, a greater magnitude of wind shear must be present before the device will emit a warning. Accordingly, modest wind shear conditions for which the pilot has already compensated by means of increased airspeed, do not cause a warning.

However, when the wind shear signal during a portion of the approach is sufficiently positive to exceed a first predetermined positive level, the warning threshold is returned to the value of the fixed reference. The large, positive value of the wind shear signal indicates a high likelihood that the head wind is caused from the outflow of a "micro burst" of wind and that the airspeed is likely to drop significantly shortly thereafter. Accordingly, in order to provide a timely warning in such circumstances, the variable reference modifier 6 operates to return the threshold to the value of the fixed reference source 8.

Finally, if the wind shear signal during a portion of the approach exceeds the second higher positive level, such circumstances indicate a very probable hazardous wind shear condition and the magnitude of the negative threshold level is reduced below that of the fixed reference in order to provide an earlier warning of unsafe conditions.

Typically, the first predetermined positive level would be of the order of 0.05 g's where g is the constant of acceleration due to gravity, and the second higher preselected positive level would be of the order of 0.15 g's.

Figure 3:
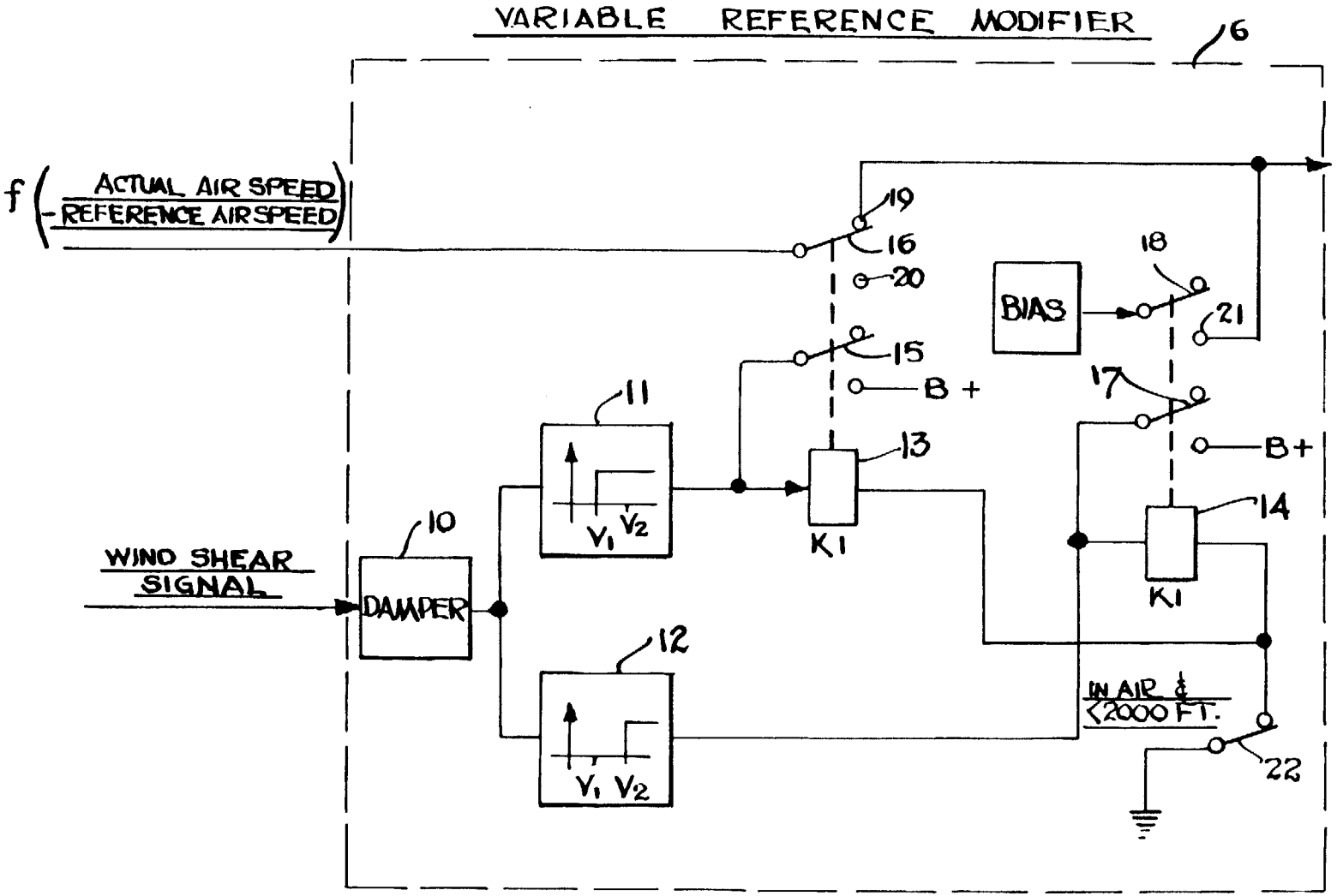
FIG. 3 is a functional block diagram of the variable reference modifier.

FIG. 3 depicts in more detail the functional operation of variable reference modifier 6 and depicts functionally the manner in which the modifications to the reference are "frozen" in response to wind shear signals. Although the functions of the variable reference modifier 6 are depicted in FIG. 3 in terms of switches, relays and other functional blocks, it is to be understood that other means including electronic digital means can be used to obtain these operating functions.

The wind shear signal that is input to variable reference modifier 6 is first input to damper 10 which is a low pass filter or averaging device which removes short term fluctuations from the wind shear signal. The damped, wind shear signal that is output from damper 10 is input to function blocks 11 and 12. The transfer function of function block 11 is depicted thereon in FIG. 3. Function block 11 outputs a zero voltage for input signals less than $V_1$ and outputs a constant voltage for input signals greater than $V_1$. Similarly, function block 12 outputs zero voltage for input voltages less than $V_2$ outputs a fixed voltage for input of voltages greater than $V_2$.

As indicated in FIG. 3 the output of function blocks 11 and 12 are applied to relays 13 and 14 respectively to operate these relays and the associated switches 15, 16, 17 and 18 when the input function 11 and 12 exceed $V_1$ and $V_2$ respectively. Operation of relay 13 causes switch 15 to connect a source of voltage represented by B+ to the winding of relay 13 thus locking relay 13 on. Operation of relay 13 also shifts switch 16 from connection 19 to connection 20 thus interrupting the output of any signal from the variable reference modifier 6. Operation of relay 14 connects switch 17 to a source of voltage represented by B+ which locks on relay 14 and causes switch 18 to connect to connector 21 which then outputs a fixed negative bias from variable reference modifier 6.

Finally in FIG. 3 switch 22 represents a switch that remains closed while the aircraft is at an altitude of less than 2,000 feet. After the aircraft lands, or when it is above 2,000 feet, switch 22 is opened and which unlocks relays 13 and 14 which then remain unlocked until a voltage is output from either function block 11 or 12 and the aircraft is at an altitude of less than 2,000 feet and in the air.

The normal approach reference airspeed that is used as an input to the invention can be obtained in any number of different ways. For instance, the numerical value may be manually inputted by the pilot prior to initiation of the landing approach. A simple keyboard could be used for this purpose. The pilot also could input such data by manually setting the position of a "bug" on the airspeed indicator, the position of the bug being sensed and communicated to the system of the invention.

The normal approach reference airspeed could also be determined by sensing the actual airspeed, the acceleration normal to the flight path, the flap position and the angle of attack of the aircraft. This data could then be used to compute the normal approach reference airspeed in a manner similar to that used for computing the approach airspeed as set forth in flight manuals. For instance, the normal approach reference airspeed, $V_n$ can be obtained from the following equation (1):

$$V_{normal} = V \cdot \sqrt{a_n \cdot \frac{(\alpha_n - \alpha_0)}{g \cdot (\alpha - \alpha_0)}} \quad (1)$$

Where V is the actual airspeed of the aircraft, $a_n$ is the acceleration normal to the flight path, g is the constant representing the acceleration due to gravity, $\alpha_n$ is the angle of attack in a normal approach which in turn is obtained from a knowledge of the measured flap position, $\alpha_o$ is a reference angle and $\alpha$ is the actual measured angle of attack, $\alpha_o$ is also a function of the flap position and its value can be computed directly from the flap position.

While the invention has been described and illustrated in detail, it is to be clearly understood that this is intended by way of illustration and example only and is not to be taken by way of limitation, the spirit and scope of this invention being limited only by the terms of the following claims.

I claim:

1. An improved aircraft wind shear warning system for warning of hazardous wind shear conditions during an aircraft landing approach of the type having means for generating a signal [representing] *which is a function of* the rate of change of the instantaneous airspeed of aircraft, means for generating a signal [representing] *which is a function of* the horizontal inertial acceleration of the aircraft, means for subtracting the horizontal inertial acceleration signal from the rate of change of the instantaneous airspeed signal to provide a wind shear signal [representing] *which is a function of* wind shear and warning device means for generating a warning signal wherein the improvement comprises:

means for generating a warning threshold the value of which warning threshold is negative and the magnitude of which warning threshold is the arithmetic combination of a pre-selected negative constant and a variable number which variable number is a function of the excess, if any, of the airspeed of the aircraft over a normal approach reference airspeed and which variable number is adjusted in response to the wind shear signal, when the wind shear signal has exceeded a pre-selected value during the landing approach; and detector means responsive to the wind shear signal for actuating said warning device means when the wind shear signal is more negative than said warning threshold.

2. An improved aircraft wind shear warning system for warning of hazardous wind shear conditions during an aircraft landing approach of the type having means for generating a signal [representing] *which is a function of* the rate of change of the instantaneous airspeed of the aircraft, means for generating a signal [representing] *which is a function of* the horizontal inertial acceleration of the aircraft, means for generating a signal [representing] *which is a function of the down draft drift angle of the aircraft, means for subtracting the horizontal inertial acceleration signal from the rate of change of the instantaneous airspeed signal and adding the down draft drift angle signal to the difference to provide a wind shear signal* [representing] *which is a function of* wind shear as modified by aircraft down draft drift angle, and warning device means for generating a warning signal wherein the improvement comprises:

means for generating a warning threshold the value of which warning threshold is negative and the magnitude of which warning threshold is the arithmetic combination of a pre-selected negative constant and a variable number which variable number is a function of the excess, if any, of the airspeed of the aircraft over a normal approach reference airspeed and which variable number is adjusted in response to the wind shear signal; and detector means responsive to the wind shear signal for actuating said warning device means when the wind shear signal is more negative than said warning threshold.

3. A method for providing an improved aircraft wind shear warning system for warning of hazardous wind shear conditions during an aircraft landing approach wherein the aircraft has means for generating a signal [representing] *which is a function of* the rate of change of the instantaneous airspeed of the aircraft, means for generating a signal [representing] *which a function of* the horizontal inertial acceleration of the aircraft, means for subtracting the horizontal inertial acceleration signal from the rate of change of the instantaneous airspeed signal to provide a wind shear signal [representing] *which is a function of* wind shear, and warning device means for generating a warning signal wherein the improved method comprises:

generating a warning threshold the value of which warning threshold is negative and the magnitude of which warning threshold is the arithmetic combination of a pre-selected negative constant and a variable number which variable number is a function of the excess, if any of the airspeed of the aircraft over a normal approach reference airspeed and which variable number is adjusted in response to the wind shear signal; and actuating said warning device means when the wind shear signal is more negative than said warning threshold.

4. An improved aircraft wind shear warning system for warning of hazardous wind shear conditions during an aircraft landing approach of the type having means for generating a signal [representing] *which is a function of* the rate of change of the instantaneous airspeed of the aircraft, means for generating a signal [representing] *which is a function of* the horizontal inertial acceleration of the aircraft, means for subtracting the horizontal inertial acceleration signal from the rate of change of the instantaneous airspeed signal to provide a wind shear signal [representing] *which is a function of* wind shear, and warning device means for generating a warning signal wherein the improvement comprises:

means for generating a warning threshold, the value of which warning threshold is negative and the magnitude of which warning threshold is the arithmetic combination of a pre-selected negative reference value and a variable reference value, the variable reference value being responsive to the excess of the airspeed over the normal approach airspeed, said variable reference value being combined as a negative amount with the fixed negative reference value so long as the wind shear signal has not previously exceeded a first pre-selected positive number during the landing approach, and wherein said variable reference value is zero when the wind shear signal has previously exceeded a first pre-selected positive number during the landing approach and has not previously exceeded a second, higher pre-selected positive number during the landing approach, and wherein said variable reference value is combined as a positive, pre-selected fixed bias number with the fixed negative reference value when the wind shear signal has exceeded the second, higher pre-selected positive number during the landing approach.

5. An improved aircraft wind shear warning system for warning of hazardous wind shear conditions during an aircraft landing approach of the type having means for generating a signal [representing] *which is a function of* the rate of change of the instantaneous airspeed of the aircraft, means for generating a signal [representing] *which is a function of* the horizontal inertial acceleration of the aircraft, means for generating a signal representing the down draft drift angle of the aircraft, means for subtracting the horizontal inertial acceleration signal from the rate of change of the instantaneous airspeed signal and adding the down draft drift angle signal to the difference to provide a wind shear signal [representing] *which is a function of* wind shear, and warning device means for generating a warning signal wherein the improvement comprises:

means for generating a warning threshold, the value of which warning threshold is negative and the magnitude of which warning threshold is the arithmetic combination of a pre-selected negative reference value and a variable reference value, the variable reference value being responsive to the excess of the airspeed over the normal approach airspeed, said variable reference value being combined as a negative amount with the fixed negative reference value so long as the wind shear signal has not previously exceeded a first pre-selected positive number during the landing approach, and wherein said variable reference value is zero when the wind shear signal has previously exceeded a first pre-selected positive number during the landing approach and has not previously exceeded a second, higher pre-selected positive number during the landing approach, and wherein said variable reference value is combined as a positive, pre-selected fixed bias number with the fixed negative reference value when the wind shear signal has exceeded the second, higher pre-selected positive number during the landing approach.

*6. An improved aircraft wind shear warning system for warning of hazardous wind shear conditions during an aircraft landing approach of the type having means for generating a signal representing the rate of change of the instantaneous airspeed of aircraft, means for generating a signal representing the horizontal inertial acceleration of the aircraft, means for subtracting the horizontal inertial acceleration signal from the rate of change of the instantaneous airspeed signal to provide a wind shear signal representing wind shear and warning device means for generating a warning signal wherein the improvement comprises:*

*means for generating a warning threshold the value of which warning threshold is negative and the magnitude of which warning threshold is the arithmetic combination of a pre-selected negative constant and a variable number which variable number is a function of the excess, if any, of the airspeed of the aircraft over a normal approach reference airspeed and which variable number is adjusted in response to the wind shear signal, when the wind shear signal has exceeded a pre-selected value during the landing approach; and*

*detector means responsive to the wind shear signal for actuating said warning device means when the wind shear signal is more negative than said warning threshold.*

* * * * *